Figure 1:
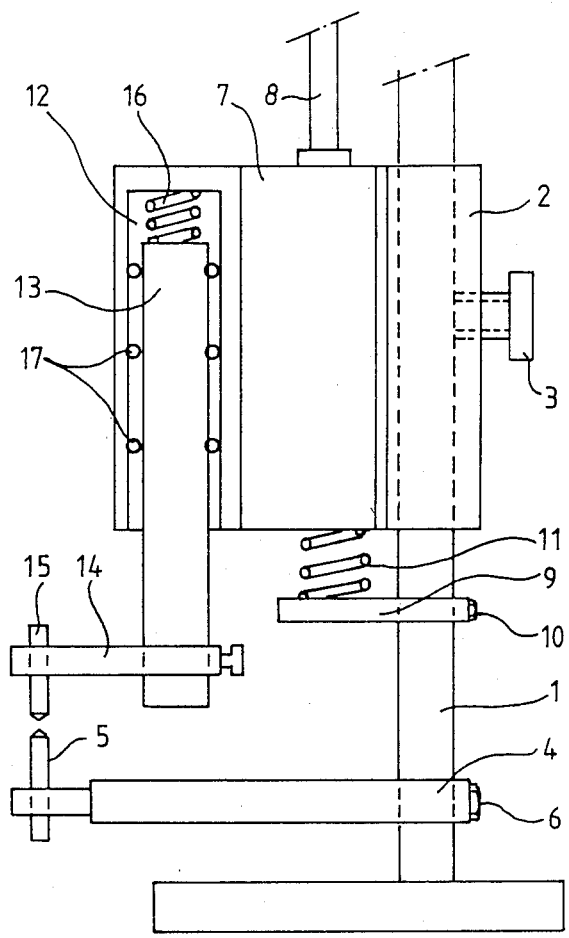

United States Patent [19]

Tijs

[11] Patent Number: 4,572,940
[45] Date of Patent: Feb. 25, 1986

[54] WELDING HEAD FOR RESISTANCE-WELDING

[75] Inventor: Hendricus C. P. Tijs, Mierlo, Netherlands

[73] Assignee: Weld-Equip b.v., Helmond, Netherlands

[21] Appl. No.: 676,285

[22] Filed: Nov. 29, 1984

[30] Foreign Application Priority Data

Dec. 5, 1983 [NL] Netherlands .......................... 8304167

[51] Int. Cl.⁴ .............................................. B23K 11/30
[52] U.S. Cl. ................................... 219/86.25; 219/89
[58] Field of Search ................. 219/86.1, 86.23, 86.25, 219/86.61, 89

[56] References Cited

U.S. PATENT DOCUMENTS

| | | | |
|---|---|---|---|
| 1,847,890 | 3/1932 | Osborne | 219/89 |
| 2,689,295 | 9/1954 | Goldner | 219/89 |
| 2,810,062 | 10/1957 | Kaunitz | 219/89 |
| 3,191,000 | 6/1965 | Nyborg | 219/86.25 |
| 4,229,637 | 10/1980 | Dederer et al. | 219/86.25 |
| 4,465,913 | 8/1984 | Stokoe et al. | 219/86.25 |

FOREIGN PATENT DOCUMENTS

| | | | |
|---|---|---|---|
| 606972 | 6/1926 | France | 219/86.1 |
| 1285359 | 8/1972 | United Kingdom | 219/86.25 |

*Primary Examiner*—Clifford C. Shaw
*Attorney, Agent, or Firm*—Cushman, Darby & Cushman

[57] ABSTRACT

A welding head for resistance welding, in particular for spot welding, comprising a frame to which a first welding electrode is fastened in a fixed position and a carrier for a second electrode lying substantially opposite the first electrode, said carrier being movable with respect to the frame in a manner such that the second electrode can be displaced in the direction to the first electrode, the second electrode being fastened to an element which is displaceably connected with the carrier in a manner such that it can perform a movement in a direction substantially parallel to the direction of movement of the carrier.

12 Claims, 3 Drawing Figures

WELDING HEAD FOR RESISTANCE-WELDING

The invention relates to a welding head for resistance welding, in particular for spot welding.

Known apparatus of the kind set forth, described for example in U.S. Pat. No. 3,191,000 comprise a frame to which a welding electrode is fastened in a fixed position, whilst a second welding electrode lying substantially opposite the first electrode is movable in the direction to the first electrode. To this end the second electrode is connected with a carrier, which is movable with respect to the frame.

During the welding operation the first electrode is in a fixed position. This does not mean, however, that this position cannot be changed with respect to the frame, since usually the first electrode is connected with a transverse carrier which is displaceable with respect to the frame.

The movement of the carrier of the second electrode with respect to the frame is often carried out by foot-control and a lever or else by means of a pneumatically or hydraulically actuated plunger.

The weld is established after the first and the second electrode are brought into contact with the two parts to be connected located between the electrodes. For establishing a satisfactory welding joint the force by which the second electrode is pressed against the work piece should have a given value depending inter alia on the thickness of the material and the conductability thereof. For this purpose U.S. Pat. No. 3,191,000 provides inter alia a spring structure. The welding current is switched on at the instant at which the pressing force attains said given value.

During the flow of the current, which takes in general only a few milliseconds, a very small part of the material to be joined fuses and forms the weld when cooled (welding lens). The formation of a perfect weld is a critical operation. Therefore, a correct adjustment of the pressure, the current strength, the current starting time and the time of current flow is of paramount importance, since otherwise a hole may be burnt in the materials or an oxide skin is formed, which does not provide a satisfactory joint.

At the instant at which the electrodes contact the parts to be joined and at which the current is switched on, the material between the electrodes is first heated so that the metal of the parts to be joined expands. Then fusion occurs in the transition zone. During all these phases of the weld formation the two parts must, of course, remain in contact with one another. It is, therefore, necessary for the movement of one electrode to be very accurately controlled. When the duration of pressure is too short no satisfactory weld is formed because solidification has not yet taken place.

The aforesaid expansion during the first phase of the weld formation gives rise to great problems. If the movable electrode is accurately held in place during this phase, the pressure between the two parts to be joined becomes too heavy due to the expansion. As a result the current or the voltage may slightly change so that a satisfactory weld cannot be obtained. Attempts have been made to solve this problem, as is apparent for example from U.S. Pat. No. 3,191,000, by arranging a spring in the moving mechanism of the movable electrode. This spring, which has, of course, to produce a given tension, is disposed between the frame and the movable carrier of the electrode.

Although this construction provides some improvement it has been found that in forming so-called microwelds irregularities will nevertheless occur, since in making a sequence of welds, which is common practice the welding quality appears to vary.

By analyses of the whole welding process leading to the present invention it has been found that the movable part and the electrode connected herewith could not sufficiently rapidly follow the expansion and subsequent shrinkage and/or followed the same too late. The cause thereof was found to be the excessive weight and hence the excessive inertia of the moving parts.

The invention has for its object to obviate the aforesaid disadvantage and to provide other advantages.

A welding head for resistance welding, embodying the invention, in particular for making spot welds, comprises a frame to which a first welding electrode is fastened in a fixed position and a carrier for a second electrode lying substantially opposite the first electrode, said carrier being movable with respect to the frame in a manner such that the second electrode can be displaced in the direction towards the first electrode and is characterized in that the second electrode is fastened to an element which is displaceably connected with the carrier in a manner such that it can perform a movement in a direction substantially parallel to the direction of movement of the carrier.

The above-mentioned carrier may be compared with the movable part used in apparatus according to the prior art. This carrier has, of course, to be movable in order to establish the connection with the work pieces. The movable electrode is, however, not directly fastened to the carrier, but to a separate element. Since this element can slide with respect to the carrier, it can move during the expansion of the metal of the parts to be joined in the first phase and follow the expansion and the subsequent shrinkage. The element may have a considerably more light-weight structure than the carrier, since the heavy forces to be exerted in operating the welding apparatus, for example, by means of the above-metnioned foot control or a pneumatic control to not directly affect the element, but affect the carrier.

At the beginning of the welding process the electrode connected with the element has, of course, to be moved in the direction towards the other electrode. Since the movement is initiated by a movement of the carrier, there has to be a connection between the carrier and the element such that sufficient pressure is exerted on the work pieces to be joined. On the other hand the element has to be movable with respect to the carrier.

It is preferred to use for this purpose a resilient movement between the two parts. A simple solution is obtained by using a compression spring. Such a compression spring can be readily arranged between the top end of the element and a fixed part of the carrier. The force of this spring has to be accurately determined in order to provide on the one hand the original pressure force and on the other hand to be sufficiently compressed during the expansion of the metals. This spring force can, of course, be obtained by precise selection, but there might also be used a setting structure controlling the tension of the spring.

The element is preferably designed in the form of a hollow body. Thus the mass and hence the inertia of the element are reduced. In a particular embodiment the element is formed by a hollow prism. By the prismatic shape a turn of the element and hence of the electrode connected herewith is avoided. This is particularly important when the electrode is not located on the axis of the element, but connected herewith through a transverse rod.

In order to improve the movability of the element with respect to the carrier, the carrier and the element are held apart by a plurality of elongate needle bearings in a particular embodiment of the present invention.

In order to minimize the inertia of the element it is preferably made from a metal having a specific weight below 4, in particular aluminium.

Figure 2:
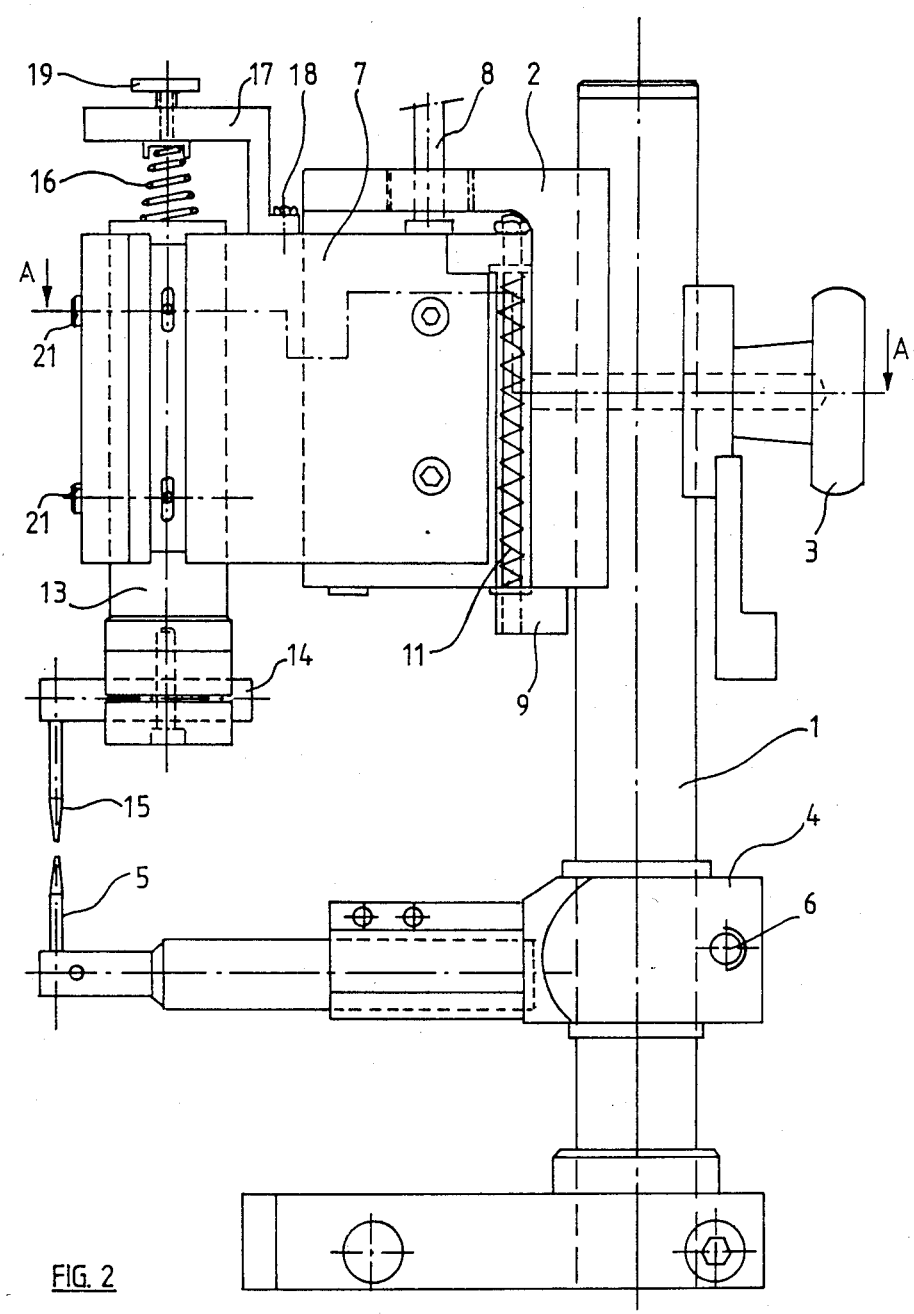
Figure 3:
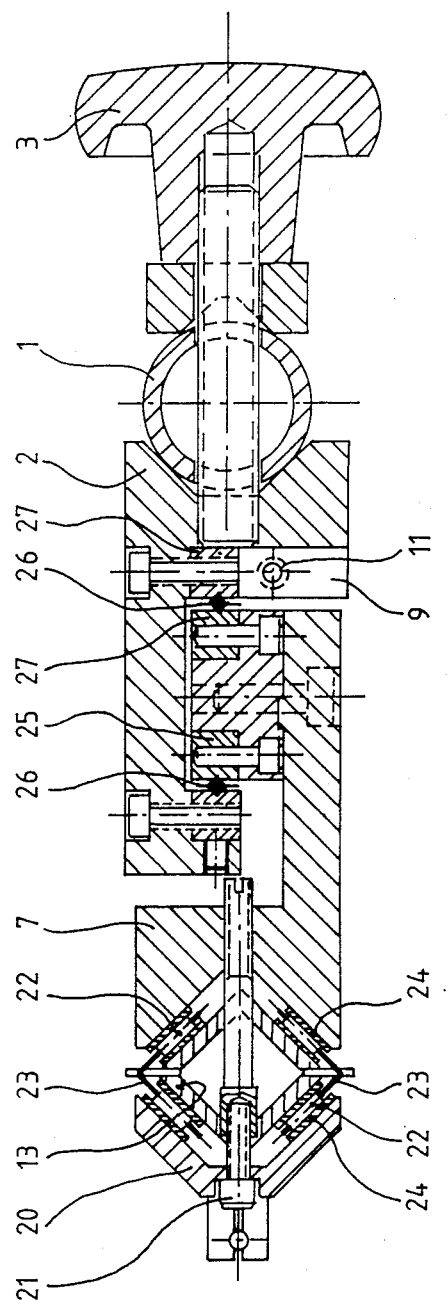

As far as is allowed with respect to strength the carrier may also be made from a light-weight material, for example, aluminium or a synthetic resin. If, as stated above, elongate needle bearings are used between carrier and element it is advantageous in accordance with a particular embodiment of the invention, to provide hard metal strips on carrier and/or element at the places where the needles bear on the two parts. These hard metal strips may be glued to the parts. In the drawing FIG. 1 schematically shows a welding head for resistance welding in accordance with the invention for illustrating the principle, FIG. 2 is an elevational view of a practical embodiment of a welding head for resistance welding in accordance with the invention and FIG. 3 is a cross-sectional view taken on the line A—A of the welding head shown in FIG. 2.

Referring to FIG. 1, reference numeral 1 designates a frame to which a block 2 is rigidly secured by means of a screw 3. The frame 1 carries a first, lower welding electrode 5. A beam 4 is fastened by means of a bolt 6 to the frame 1 and displaceable along the same in a direction of height. To the block 2 is fastened a carrier 7 in a manner such that it can slide up and down along the block 2. This movement is limited on two sides by end switches and is produced by means of a pin 8 coupled, for example, with a pneumatically operating cylinder. Below the carrier 7 is arranged a beam 9, which is rigidly secured to the frame 1 by means of a bolt 10. During the downward movement of the pin 8 a spring 11 located between the carrier 7 and the beam 9 is compressed. A cavity 12 of the carrier 7 accommodates an element 13, which can slide up and down in said cavity. To this element, on the underside, is rigidly secured a hollow transverse beam 14 embedded in a synthetic resin holder (FIG. 2) carrying the second welding electrode 15, which is insulated from the electrode 5. Between the top side of the element 13 and the bottom of the cavity 12 is arranged a compression spring 16. Between the carrier 7 and the element 13 are arranged needles or balls 17 for reducing friction between the last-mentioned parts.

The mode of operation of the welding head for resistance welding shown in FIG. 1 can be briefly described as follows.

After the parts to be joined, for example, by spot welding are arranged between the electrodes 5 and 15 the pin 8 is pressed against the force of the spring 11 to produce a downward movement of the carrier 7. This downward movement is transferred by means of the spring 16 to the element 13 and the second welding electrode 15 connected with the latter. At the instant at which the electrode 15 touches the parts to be joined and exerts pressure on the electrode 5, the spring 16 is slightly compressed. This spring fixes the pressure exerted by the electrodes on the parts to be joined. By means of a switch connected to the element 13 the welding current is switched on as soon as the pressure force attains a given value. It is of essential importance that this force should be maintained for the entire welding cycle which usually does not take more than a few milliseconds. During the welding cycle the parts to be joined expand and subsequently shrink. It is of essential importance for the electrodes to follow this movement resulting from the thermal effect. If the spring 16 were lacking, the pressure force would strongly increase. The spring 16 however, ensures that the force maintains a substantially constant value despite the expansion and the subsequent shrinkage at the welding area. The same could be believed to be obtainable if the element 13 were rigidly secured to the carrier 7 and a spring were disposed between the pin 8 and the carrier 7. Since the whole welding operation on the parts to be joined is very rapidly performed it is necessary for the upward and downward movement of the element 13 to match the operation within the time fixed. If the whole carrier, which has a fairly heavy weight and hence a fairly high inertia for structural reasons, has to be moved up and down, it would practically not be possible to maintain constant the pressure between the electrodes 5 and 15 and the work piece. In the construction embodying the invention, however, only the element 13 need move up and down and this element has a materially smaller mass than the carrier 7. This enables to maintain the pressure between the electrodes 5 and 15 substantially constant. The mass of the element 13 may, moreover, be reduced by making it hollow. Moreover, the friction between the carrier 7 and the element 13 can be considerably reduced by means of the rollers or balls 17. A further reduction of the weight of the element 13 can be obtained by selection of the material. It is preferred to choose for this element a material having a specific weight below 4, in particular aluminium. The selection of the material for the carrier 7 is in the first place determined by structural considerations. However, even then aluminium is preferred. Thus the weight of the whole construction is lower and the rate of movement of the carrier 7 may be chosen to be higher.

In FIG. 2 parts corresponding with those shown in FIG. 1 are designated by the same reference numerals. In this practical embodiment the compression spring 16 is located between the top side of the element 13 and an angle-section beam 17, which is fastened at 18 by means of a bolt to the movable carrier. Reference numeral 19 designates a screw by means of which the bias tension of the spring 16 can be set.

From the cross-sectional view of FIG. 3 taken on the line A—A in FIG. 2 it is apparent that the element 13 is a hollow prism. By the prismatic shape and the enclosure of the prism between the carrier 7 and the angle-section beam 20 the element 13 is prevented from turning. Thus the electrode 15 remains accurately directed above the electrode 5. The angle-section fillet 20 is connected with the carrier 7 by means of bolts 21, which extend through elongate holes in the element 13. Between the carrier 7 and the angle-section fillet 20 on the one hand and the prismatic element 13 on the other hand are arranged elongate needle bearings. These needle bearings are formed by rollers 22 accommodated in plate-shaped cages 23. The inclined sides of the carrier 7 and the angle-section fillet 20 are provided with hard steel strips 24. Similar hard steel strips are provided on the prismatic element 13. These strips are particularly required when the parts 7, 20 and 13 are made from aluminium or synthetic resin. They may be fastened to the various parts by gluing.

The carrier 7 can slide along the block 2 by means of the device designated by 25. This device comprises angle-section steel fillets 26 and elongate bearing blocks 27 bearing on the former.

By the disposition of the prism, which is turned through an angle of substantially 45° about the longitudinal axis, specific structural advantages are obtained. Both the element and the carrier may be made from a synthetic resin. Thus, on the one hand an advantageous value of the number of welds made per unit time is attained—since the welding head being reduced can be more rapidly moved up and down—and on the other hand, owing to the low weight of the element an advantageous value is obtained for the rate of follow-up of the electrode.

As will be evident to those skilled in the art the welding head embodying the invention may also be used for soldering with the aid of "reflow" techniques.

Since the prism is turned through 45° it can be fastened by means of pins or bolts extending along a diagonal so that division of the bearings is avoided and a compact construction can be made.

I claim:

1. A welding head for resistance welding, in particular for making spot welds, comprising a frame to which a first electrode is fastened in a fixed position and a carrier for a second electrode located substantially opposite the first electrode, said carrier being movable with respect to the frame in a manner such that the second electrode can be displaced in the direction towards the first electrode characterized in that the second electrode is fastened to an element located between the second electrode and the carrier and slidable with respect to the carrier in a manner such that it can perform a movement in a direction which is substantially parallel to the direction of movement of the carrier, said element having a lower mass than said carrier.

2. A welding head as claimed in claim 1 characterized in that the element and the carrier are interconnected by at least one spring.

3. A welding head as claimed in claim 1, characterized in that the element is a hollow body.

4. A welding head as claimed in claim 3 characterized in that the hollow body has a prismatic cross-section.

5. A welding head as claimed in claim 4 characterized in that the section of the prism is rectangular and is turned through an angle of substantially 45° about the longitudinal axis.

6. A welding head as claimed in claim 1, characterized in that the element and the carrier are separated from one another by a plurality of elongate needle bearings.

7. A welding head as claimed in claim 6, characterized in that the needles of the bearings strike hard steel strips fastened to the element, to an angle-section fillet (20) and the carrier.

8. A welding head as claimed in claim 7 characterized in that the hard steel strips are fastened by gluing.

9. A welding head as claimed in claim 1, characterized in that the element is made from a material having a specific weight below 4.

10. A welding head as claimed in claim 9 characterized in that the element is made from aluminum or synthetic resin.

11. A welding head for resistance welding of spot welds comprising a frame having a fixed first electrode extending therefrom, a carrier member mounted on said frame for sliding movement on the frame, a second electrode opposite said first electrode mounted on an element, said element being slidably mounted on the carrier and being spring biased such that the second electrode is urged toward the first electrode, the element having a lower mass than the carrier.

12. A resistance welding device for spot welding comprising first and second electrodes, a frame having said first electrode fixed thereto, a carrier member mounted on the frame and supporting an element, the second electrode being fixed to the element, the carrier member being slidable on the frame such that the first and second electrodes can be brought together, the element being spring biased to the carrier whereby the second electrode is constantly urged toward the first electrode whereby the first and second electrodes are able to maintain a constant pressure against a workpiece during welding independent of thermal expansion and contraction of the workpiece, the element having a lower mass than said carrier.

* * * * *